July 4, 1967 P. A. M. HOSPEL 3,329,874

PLANAR SEMICONDUCTOR DEVICE WITH IMPROVED EMITTER AND BASE CONFIGURATION

Filed April 20, 1965

INVENTOR.
PETRUS A.M. HOSPEL

BY

AGENT

United States Patent Office
3,329,874
Patented July 4, 1967

3,329,874

PLANAR SEMICONDUCTOR DEVICE WITH IMPROVED EMITTER AND BASE CONFIGURATION

Petrus Albertus Maria Hospel, Mollenhutseweg, Nijmegen, Netherlands, assignor to North American Philips Company, Inc., New York, N.Y., a corporation of Delaware Filed Apr. 20, 1965, Ser. No. 449,397
Claims priority, application Netherlands, Apr. 21, 1964, 6,404,322
3 Claims. (Cl. 317—235)

ABSTRACT OF THE DISCLOSURE

A semiconductor device of the planar type in which the base zone is generally rectangular, and the emitter zone is located within the base zone at one side with an extension toward the other side, forming a generally P configuration. The emitter contact is made to the broadened part, and the base contact is made to the region adjacent the emitter extension. The relatively simple configuration improvement offers a significant improvement in the collector current emitter-collector voltage characteristic exhibited by the resultant device.

This invention relates to a semiconductor device comprising at least one transistor, wherein a base zone having an elongated surface, for example substantially rectangular, lies on one side of a semiconductor plate, while in a zone of this elongated base zone which is adjacent one short side thereof there is formed an emitter zone which fits into the surface of the base zone with some clearance and a base contact is formed on the remaining zone which is adjacent the other short side of the base zone.

A transistor of this kind, which is often referred to as a "planar transistor," may be arranged as a single structural element or as part of a solid circuit in the semiconductor plate. The patterns desired for the surface of the base zone and the emitter zone may be obtained, as is well-known, by means of masking techniques using oxide layers, usually of silicon oxide, in which windows of the desired shape are formed by etching with the use of photographic techniques. By local diffusion of impurities or epitaxial growth of semiconductor material activated with impurities, it is then possible to obtain selectively through the said windows a base zone or an emitter zone of a corresponding pattern in or on the semiconductor plate.

In the simple embodiment of these transistors which is most commonly employed, the surface of the base zone has a substantially rectangular or elliptical elongated shape, an emitter zone, for example in the form of a smaller square zone, being formed in that half of the base zone which is adjacent one short side thereof, and the base contact being formed, next to the emitter zone, on the other half of the surface of the base zone. More complicated patterns of base contact, emitter zone and base zone have previously been suggested such as, for example, a pattern in which the base contact circularly surrounds the emitter zone, or another in which the base contact and the emitter zone intermesh like the teeth of a comb, or yet another pattern in which the emitter zone is made star-shaped. However, the manufacture and the use of the masks required for the photographic techniques become more difficult as the patterns are more complicated, whereas such complicated patterns are not required for many uses. It is also known that the surface area of the base zone is highly determinative of the capacitance of the collector so that this surface area is kept as small as possible.

The present invention is based inter alia upon recognition of the fact that by making an only slight modification, which can be carried out in a simple manner, to the shape of the emitter zone and the positioning of the base contact in the aforementioned simple embodiment which is most commonly employed, the available surface of the base zone can be used more advantageously in electrical respect, without detracting from other electrical properties, such as the capacitance of the collector, inter alia to improve the behaviour at higher current strength and/or to obtain an improvement in the characteristic of the transistor as is desirable for many switching applications, which characteristic shows the relationship between the collector current $I_c$ and the potential difference between the collector and the emitter, $V_{ac}$, at a constant base current $I_b$.

In a semiconductor device comprising at least one transistor of the kind mentioned in the preamble, according to the invention the emitter zone located in the said one zone has a narrower extension zone in the other zone of the surface area of the base zone, said extension zone extending near one long side of the surface of the base zone substantially up to the short size of the other zone, while in the remaining space of the other zone and near the other long side thereof a base contact is formed on the base zone to fit with some clearance into this remaining space. In one very suitable embodiment the surface of the base zone has substantially the shape of an elongated rectangle, while the emitter zone comprises a surface portion preferably approximately square, which lies near one short side and on which the emitter contact is provided, and a narrower extension zone which, starting from the said square portion, extends in the form of an elongated strip along one long side of the surface of the base zone up to near the other short side thereof.

The surface area available for providing the base contact between the emitter zone and the edge of the base zone is preferably approximately of the same size as the surface area of the emitter zone without its extension zone so that the emitter contact and the base contact may be positioned with equal clearance and, under these conditions, the surface area of the base zone is kept in practice as small as possible.

In order that the invention may be readily carried into effect, one embodiment thereof will now be described in detail, by way of example, with reference to the accompanying diagrammatic drawings, in which.

Figure 2:
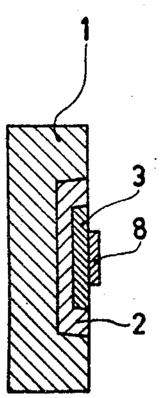
FIGURE 1 is a plan view of a semiconductor device according to the invention and FIGURES 2 and 3 are two cross-sectional views, taken on the lines II—II and III—III, respectively, of FIGURE 1.
Figure 1:
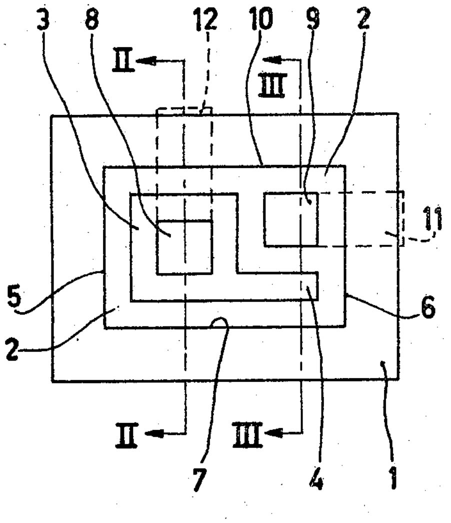
Figure 3:
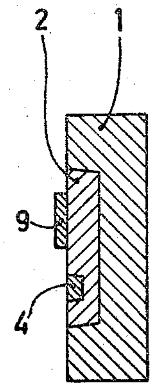

A p-conductive base zone 2 having an elongated surface, substantially rectangular, has been diffused into a semiconductor plate 1 (FIGURES 1 to 3), which is of n-conductive silicon of, for example, 0.3 ohm-cm., said zone having penetrated up to $3\mu$ beneath the semiconductor surface. The dimensions of the surface of the base zone are, for example, $85\mu$ x $125\mu$. An n-conductive emitter zone has been diffused into the p-conductive base zone 2 with a penetration depth of, for example, $2\mu$ and comprises a substantially square portion 3 having a surface area of approximately $55\mu$ x $55\mu$ and a narrow rectangular extension zone 4 of approximately $40\mu$ long and approximately $15\mu$ wide. The substantially square portion 3 fits with some clearance into the surface 2 of the base zone and is located near one short side 5 thereof. The clearance between the edge of the portion 3 and the edge of the base zone 2 is approximately $15\mu$. The extension zone 4 extends at a distance of likewise $50\mu$ from the long side 7 up to approximately $15\mu$ from the short side 6.

The square portion 3 of the emitter zone is provided with an emitter contact layer 8 which fits into the square portion 3 with some clearance, for example at a distance of 15$\mu$ from the edge of the emitter, and which has dimensions of approximately 25$\mu$ x 25$\mu$. A base contact layer 9 having the same dimensions is formed with the same clearance on the remaining space of the base zone between the emitter zone (3, 4) and the edges 6 and 10.

Figure 4:
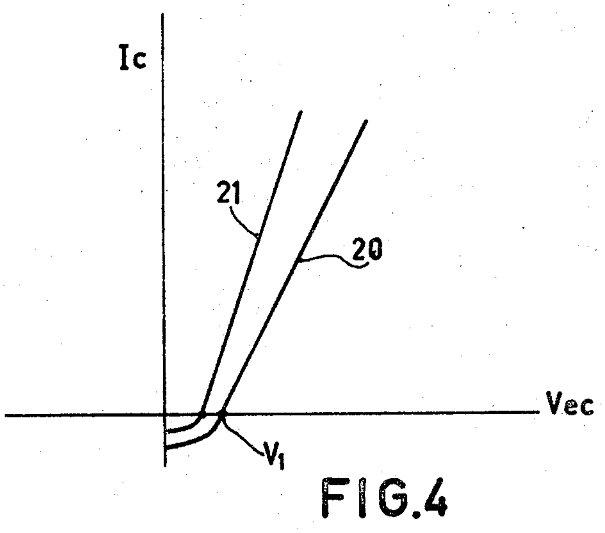
FIGURE 4 shows graphically an $I_c$-$V_{ac}$ characteristic at a constant $I_b$ of a transistor according to the invention as compared with that of a known transistor.

Thus, in the embodiment according to the invention, sufficient and equal surfaces are yet available for the positioning of the base contact 9 and the emitter contact 8 with the same clearance, while the clearance of the emitter zone (3, 4) and the base zone 2 is also substantially the same. Since in the transistor according to the invention as compared with a known usual embodiment the base contact 9 is displaced to the sides 10 and 6, a more efficient use has been made of the available space with the surface of the base unchanged by adding the extension zone 4 to the emitter zone 3. This results in the advantage that the surface area of the emitter zone is increased with the surface of the collector unchanged and especially also that the length of the edge of the emitter zone 3 which is adjacent the base contact 9 is considerably increased. With the surface of the collector unchanged, an effectively larger emitter zone is thus obtained, the increase in length of its edge being a considerable improvement especially for higher currents and higher frequencies. Furthermore the embodiment according to the invention yields an improvement in the $I_c$-$V_{ec}$ characteristic as may be explained with reference to the diagrammatic FIGURE 4. Curve 20 relates to the known transistor without an extension zone for a given constant base current $I_b$. For switching uses it is important that the point of intersection $V_1$ of this curve with the horizontal $V_{ec}$ axis lies as close as possible to the $I_c$ axis and that the rising branch also approaches the $I_c$ axis as closely as possible. Now, the investigations underlying the present invention hinted at the fact that, in a transistor according to the invention, by increasing the surface area of the emitter zone with unchanged surface of the base zone and by increasing that length of the emitter zone which is adjacent the base contact, the point of intersection with the $V_{ec}$ axis lies closer to the $I_c$ axis and that the rising branch is steeper as shown diagrammatically by curve 21 in FIGURE 4.

As far as the manufacture of a semiconductor device according to the invention is concerned, it should be noted that this may be carried out in a known and usual manner by using masking techniques and photographic techniques. Thus, for example, first the base zone 2 is formed by first covering the surface with a silicon oxide layer and then a window of the rectangular shape desired for the base zone is etched in the usual manner by using photoresist techniques. Next, the p-conductive base zone is formed in the window by diffusion of, for example, boron. During or after this diffusion the base zone window is again covered with an oxide layer, whereafter the process is repeated to form now the window desired for the emitter zone and to provide in this window the n-conductive emitter layer by diffusion of phosphorous. After or during this diffusion the emitter zone window is likewise closed and then the windows desired for the base contact 9 and the emitter contact 8 are formed in which the base-contact layer 9 and the emitter contact layer 8 are evaporation-deposited, which layers may extend, if desired, over the oxide layer still present and insulated from the semiconductor plate, for example, as evaporation-deposited strips 11 and 12, shown in broken lines for the sake of clarity, to the edge of the plate 1 for the purpose of connecting the supply wires. If desired, the oxide layers may remain on the plate. For the sake of clarity, these oxide layers are not shown, the more so as they are not essential to the invention and of a similar structure to those of conventional planar transistors.

In conclusion, it is to be noted that the invention is not limited to the example described hereinbefore, but rather several modifications are possible to the man skilled in the art within the scope of the invention. Although the described shape of the various zones, which is in practice accurately right-angled, is simple and has been found to be very favourable, it is also possible to round the corners or, if desired, to give the base zone an elliptical shape, in which event the shape of the emitter zone and/or of the emitter contact and the base contact are matched by rounding to the round shape of the base zone so that the emitter zone and the base contact are located from the edge of the base zone with substantially constant clearance, while also the extension zone, which is located, for example, at a substantially constant distance from the long side of the base zone, acquires a slightly curved shape. Further it will be evident that, for example, the base zone 2 may be obtained by epitaxial growth instead of by diffusion. It will also be evident that the emitter zone, the base contact and the emitter contact may have an elongated shape, if desired, in which event the base-zone is matched so as to surround them with clearance.

What is claimed is:

1. A semiconductor device of the planar type comprising a body of semiconductive material, a first elongated surface zone in said body and constituting a base zone, said base zone having a generally rectangular perimeter with opposite short sides between opposite long sides, a second surface zone completely within the first zone and constituting an emitter zone, said emitter zone comprising a first portion adjacent one short side of the base zone and having a perimeter generally matching that of said one short side and the adjacent long side portions and a single second portion extending from the first portion in a direction toward the opposite short side but much closer and substantially parallel to one long side of the base zone than the opposite long side forming a generally rectangular area defined by the said opposite long side, the said opposite short side, and the facing sides of the emitter first and second portions, a generally rectangular emitter contact located on the emitter first portion adjacent said one short side, and a generally rectangular base contact located on the said formed rectangular area adjacent said opposite short side.

2. A semiconductor device as set worth in claim 1 wherein the emitter zone first portion is substantially square, the formed rectangular area is substantially square, and the emitter and base contacts are substantially square and fitted symmetrically within the substantially square emitter first portion and the formed substantially square area, respectively.

3. A semiconductor device as set forth in claim 2 wherein the area of the emitter zone and the area of the formed substantially square area are approximately of the same size.

References Cited

UNITED STATES PATENTS

| | | | |
|---|---|---|---|
| 3,160,800 | 12/1964 | Smart | 317—235 |
| 3,214,652 | 10/1965 | Knowles | 317—235 |
| 3,230,428 | 1/1966 | Evans | 317—234 |

JAMES D. KALLAM, *Primary Examiner.*

A. M. LESNIAK, *Assistant Examiner.*